(12) United States Patent
Kim

(10) Patent No.: US 10,437,425 B2
(45) Date of Patent: *Oct. 8, 2019

(54) PRESENTING A MENU AT A MOBILE DEVICE

(71) Applicant: Google LLC, Mountain View, CA (US)

(72) Inventor: Kibeom Kim, Mountain View, CA (US)

(73) Assignee: GOOGLE LLC, Mountain View, CA (US)

( * ) Notice: Subject to any disclaimer, the term of this patent is extended or adjusted under 35 U.S.C. 154(b) by 273 days.

This patent is subject to a terminal disclaimer.

(21) Appl. No.: 15/132,138

(22) Filed: Apr. 18, 2016

(65) Prior Publication Data
US 2016/0231925 A1    Aug. 11, 2016

Related U.S. Application Data

(63) Continuation of application No. 14/029,688, filed on Sep. 17, 2013, now Pat. No. 9,317,183.
(Continued)

(51) Int. Cl.
*G06F 3/0482* (2013.01)
*G06F 3/0486* (2013.01)
(Continued)

(52) U.S. Cl.
CPC .............. *G06F 3/0482* (2013.01); *G06F 3/02* (2013.01); *G06F 3/0486* (2013.01);
(Continued)

(58) Field of Classification Search
CPC .. G06F 3/04883; G06F 3/0488; G06F 3/0482; G06F 3/04842; G06F 3/04817; G06F 3/0486; G06F 3/02; G06F 3/04886
See application file for complete search history.

(56) References Cited

U.S. PATENT DOCUMENTS 9,317,183 B2 *  4/2016  Kim ...................... G06F 3/0482
2009/0051665 A1  2/2009  Jang et al.
(Continued)

OTHER PUBLICATIONS

Raphael, "4 hidden settings to make Chrome for Android even better," Jul. 19, 2013, <blogs.computerworld.com/android/22497/chrome-android-hidden-settings>, 6 pages.
(Continued)

*Primary Examiner* — Jennifer N To
*Assistant Examiner* — Amy P Hoang
(74) *Attorney, Agent, or Firm* — Morgan, Lewis & Bockius LLP

(57) ABSTRACT

Systems and methods for presenting a menu at a computing device are provided. In some aspects, an indication of a user touching a hardware menu button of the computing device is received, where the hardware menu button is separate and distinct from a touchscreen of the computing device. A menu on the touchscreen is presented in response to the user touching the hardware menu button, where the menu includes multiple menu elements, and where each menu element has a corresponding command. An indication of the user touching the touchscreen at a starting point within a dragging-start region of the touchscreen is received. An indication of the user dragging a touching device along the touchscreen from the starting point to a termination point is received, where the termination point is associated with a termination menu element. A signal is provided for execution of the corresponding command of the termination menu element.

14 Claims, 6 Drawing Sheets

Related U.S. Application Data

(60) Provisional application No. 61/868,035, filed on Aug. 20, 2013.

(51) Int. Cl.
*G06F 3/0488* (2013.01)
*G06F 3/02* (2006.01)
*G06F 3/0481* (2013.01)
*G06F 3/0484* (2013.01)

(52) U.S. Cl.
CPC ........ *G06F 3/0488* (2013.01); *G06F 3/04817* (2013.01); *G06F 3/04842* (2013.01); *G06F 3/04883* (2013.01); *G06F 3/04886* (2013.01)

(56) References Cited

U.S. PATENT DOCUMENTS

| | | |
|---|---|---|
| 2010/0095234 A1 | 4/2010 | Lane et al. |
| 2010/0251152 A1 | 9/2010 | Cho et al. |
| 2011/0157029 A1* | 6/2011 | Tseng .................. G06F 3/04883 345/173 |
| 2011/0221684 A1* | 9/2011 | Rydenhag ............... G06F 3/041 345/173 |
| 2012/0110517 A1 | 5/2012 | Sparks et al. |
| 2012/0212438 A1 | 8/2012 | Vaisanen |
| 2012/0319948 A1 | 12/2012 | Kim et al. |
| 2015/0301713 A1* | 10/2015 | Suda ..................... G06F 3/0487 715/762 |
| 2017/0147196 A1* | 5/2017 | Matthews ............. G06F 3/0482 |

OTHER PUBLICATIONS

Summerson, "Tip: Chrome 29 Beta Now Has a Flag for 'Draggable Menu'—Lets You Access Menu Options With One Motion," Mar. 27, 2013, <www.androidploice.com/2013/07/16/tip-chrome-29-beta-now-has-a-flag-for-draggable-menu-lets-you-access-menu-options-with-one-motion>.

* cited by examiner

PRESENTING A MENU AT A MOBILE DEVICE

CROSS REFERENCE TO RELATED APPLICATION

This application is a continuation of U.S. patent application Ser. No. 14/029,688, entitled "PRESENTING A MENU AT A MOBILE DEVICE," filed on Sep. 17, 2013, which claims priority under 35 U.S. C. § 119(e) and the benefit of U.S. Provisional Application No. 61/868,035, filed Aug. 20, 2013, and entitled, "PRESENTING A MENU AT A MOBILE DEVICE." The disclosures of all these applications are hereby incorporated by reference in their entirety for all purposes.

BACKGROUND

The subject technology generally relates to user interfaces for computers and, in particular, relates to presenting a menu at a mobile device.

Some mobile devices, for example, some models of mobile phones or tablet computers, feature a touchscreen and a menu button, separate and distinct from the touch screen, which, when selected causes the touchscreen to display a menu associated with a home screen of the mobile device or an application executing on the mobile device.

SUMMARY

In some aspects, the disclosed subject matter relates to a method for presenting a menu at a computing device. The method includes receiving, at a first time, an indication of a user touching a hardware menu button of the computing device, where the hardware menu button is separate and distinct from a touchscreen of the computing device. The method includes presenting, in response to the user touching the hardware menu button, a menu on the touchscreen, where the menu includes multiple menu elements, and wherein each menu element has a corresponding command. The method includes receiving, at a second time, an indication of the user touching the touchscreen at a starting point within a dragging-start region of the touchscreen. The method includes receiving an indication of the user dragging a touching device along the touchscreen from the starting point to a termination point, where the termination point is associated with a termination menu element. The method includes signaling for execution of the corresponding command of the termination menu element.

In some aspects, the disclosed subject matter relates to a non-transitory computer-readable medium encoded with executable instructions. The instructions include code for receiving an indication of a user touching a hardware menu button of the computer, where the hardware menu button is separate and distinct from a touchscreen of the computer. The instructions include code for presenting, in response to the user touching the hardware menu button, a menu on the touchscreen, where the menu includes multiple menu elements, and where each menu element has a corresponding command. The instructions include code for receiving an indication of the user touching the touchscreen at a starting point within a dragging-start region of the touchscreen. The instructions include code for receiving an indication of the user dragging a touching device along the touchscreen along a dragging path from the starting point to a termination point, where the termination point is associated with a termination menu element. The instructions include code for determining whether the termination point is closer than a threshold length to an edge of the touchscreen. The instructions include code for signaling for execution of the corresponding command of the termination menu element in a case where the termination point is not closer than the threshold length to the edge of the touchscreen. The instructions include code for foregoing signaling for execution of the corresponding command of the termination menu element in a case where the termination point is closer than the threshold length to the edge of the touchscreen In some aspects, the disclosed subject matter relates to a computing device. The computing device includes a touchscreen, a hardware menu button separate and distinct from the touchscreen, one or more processors, and a memory. The memory includes instructions. The instructions include code for receiving a touch-up event or a touch-down event at the hardware menu button. The instructions include code for presenting, in response to the touch-up event or the touch-down event at the hardware menu button, a menu on the touchscreen, where the menu includes multiple menu elements, and where each menu element has a corresponding command. The instructions include code for receiving multiple touch events at the touch screen, the multiple touch events corresponding to a dragging path from a starting point to a termination point, where the starting point is within a dragging-start region of the touchscreen, and where the termination point is associated with a termination menu element. The instructions include code for signaling for execution of the corresponding command of the termination menu element.

It is understood that other configurations of the subject technology will become readily apparent from the following detailed description, where various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

Features of the subject technology are set forth in the appended claims. However, for purpose of explanation, several aspects of the disclosed subject matter are set forth in the following figures.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent that the subject technology is not limited to the specific details set forth herein and may be practiced without these specific details. In some instances, certain structures and components are shown in block diagram form in order to avoid obscuring the concepts of the subject technology.

As set forth above, some mobile devices feature a touchscreen and a menu button, separate and distinct from the touch screen, which, when selected, causes the touchscreen to display a menu. In order to select an icon on the menu, a user must lift his/her finger from the menu button and place the finger on a position of the touchscreen corresponding to the icon. This lifting of the finger is time consuming and counterintuitive for some users. As the foregoing illustrates, a new approach for presenting a menu at a mobile device and selecting a menu item may be desirable.

The subject technology relates to presenting a menu at a mobile device. According to some implementations, the mobile device has a hardware menu button and a touchscreen. The hardware menu button is separate and distinct from the touchscreen and is not included on the touchscreen. In response to a user of the mobile device touching the menu button, the mobile device presents a menu on the touchscreen. The menu is associated with a home screen of the mobile device or an application executing on the mobile device. The menu includes multiple icons and each icon has a corresponding command that is executed in response to selecting the icon. The user touches the touchscreen in a dragging-start region of the touchscreen, which may be, for example, a region within a threshold distance (e.g., 1 centimeter) of the bottom of the touchscreen and drags a touching device (e.g., a finger or a stylus) from a starting point in the dragging-start region to a termination point associated with a termination icon. The termination icon is one of the icons on the menu. The user finishes dragging the touching device at the termination point, and the mobile device executes the corresponding command of the termination icon.

As used herein, the phrase "hardware menu button" may include a menu button that is separate and distinct from a touchscreen and is not presented on the touchscreen. The phrase "software menu button" may refer to a menu button that is presented on the touchscreen, for example, via an application featuring a menu button.

Figure 1:
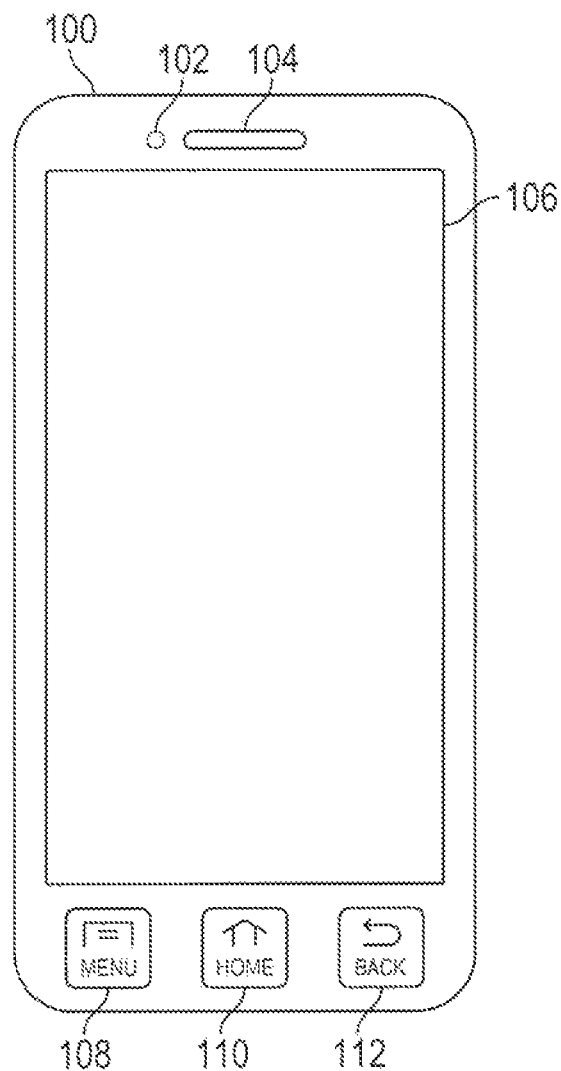
FIG. 1 illustrates an example mobile device interface.

FIG. 1 illustrates an example mobile device interface 100. As shown, the mobile device interface 100 includes a camera 102, a speaker 104, a touchscreen 106, a menu button 108, a home button 110, and a back button 112.

The camera 102 operates by taking photograph(s) or video(s) and storing the taken photograph(s) or video(s) in a memory of the mobile device or transmitting the taken photograph(s) via a network, for example, to a photograph sharing service or a video calling service. The speaker 104 operates by providing audio output, for example, playing music or providing audio associated with a telephone call. The touchscreen 106 operates by presenting visual data to a user and receiving touch input from the user. The user may provide touch input for the touchscreen 106 using a finger or a stylus. The menu button 108 is a hardware menu button. The menu button 108, when pressed, causes the mobile device to display a menu. The displayed menu may be associated with information presented at the touchscreen 106 immediately before requesting the menu. For example, if a banking application is displaying data at the touchscreen 106 immediately before the menu button 108 is pressed, the menu displayed when the menu button 108 is pressed may be associated with the banking application. The home button 110, when pressed, causes the mobile device to display a home screen. The home screen may include on-screen buttons to access some applications or webpage(s). The back button 112, when pressed, causes the touchscreen 106 to display information that was previously displayed at the touchscreen. For example, if a user switches from viewing a first document to viewing a second document in a document processor application, pressing the back button 112 may cause the document processor application to display the first document again. some cases, the mobile device interface 100 is a flat surface extending to include at least the touch screen 106 and the menu button 108.

As illustrated in FIG. 1, the menu button 108 is adjacent to the bottom side of the touchscreen 106. However, the menu button 108 may be located anywhere in the mobile device interface 100. For example, the menu button may be adjacent to the top side, the left side, or the right side of the touchscreen 106.

Figure 2:
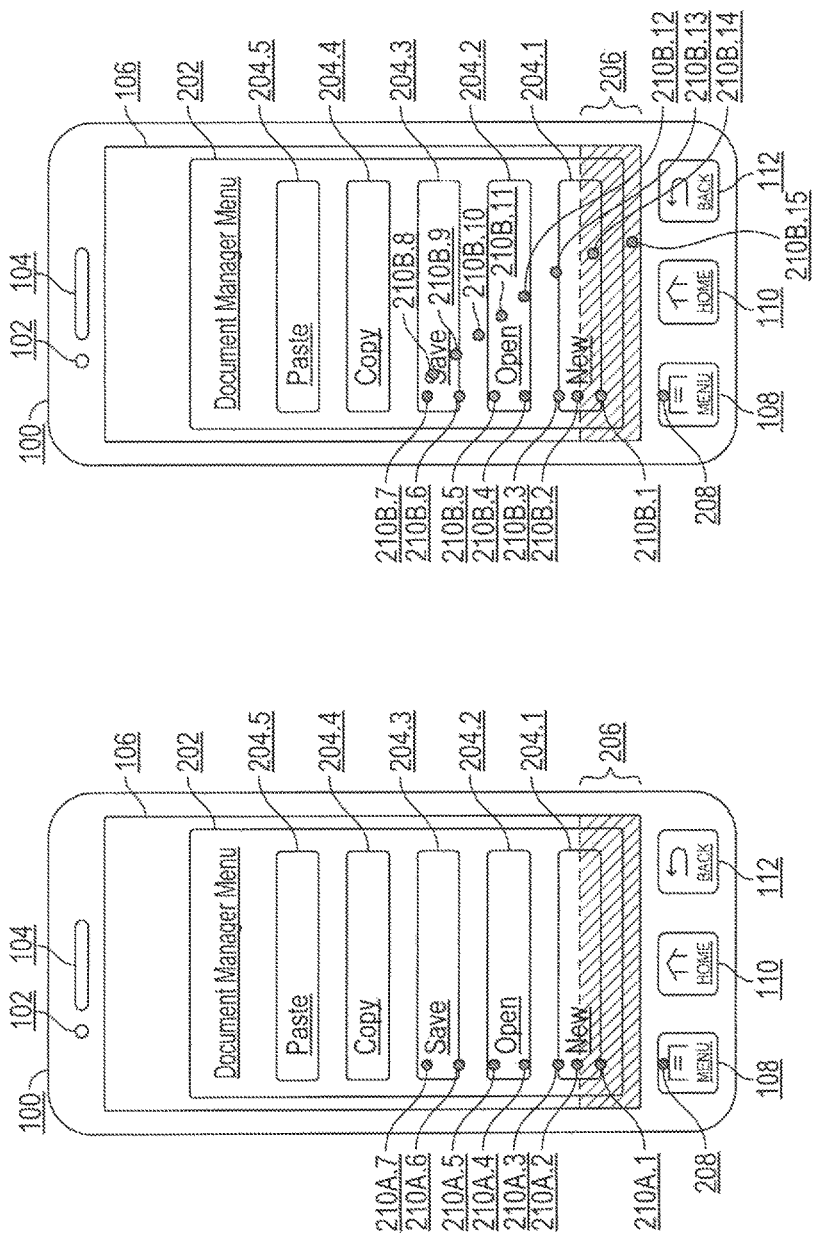
FIGS. 2A-2B illustrate example mobile device interfaces for displaying a menu and making a dragging gesture on the menu.

FIGS. 2A-2B illustrate example mobile device interfaces for displaying a menu and making a dragging gesture on the menu.

FIG. 2A illustrates the mobile device interface 100 of FIG. 1, including the camera 102, the speaker 104, the touchscreen 106, the menu button 108, the home button 110, and the back button 112.

As shown, the touchscreen 106 displays a menu 202 (e.g., a menu for a document manager application executing on the mobile device). The user may have caused the menu 202 to be displayed by pressing the menu button 108, for example, at touch point 208. The document manager menu includes icons 204.1-5, including new icon 204.1, open icon 204.2, save icon 204.3, copy icon 204.4, and paste icon 204.5. Each of the icons 204.$k$ (where k is a number between 1 and 5) has a corresponding command (e.g., create new document, open document, save document, copy, or paste) that is executed when the icon is selected. While the menu 202 is illustrated as including five icons 204.1-5, the subject technology may be implemented with any number of icon(s) in the menu 202, for example, one icon or multiple icons. Also, the subject technology may be implemented with any menu 202, not necessarily a menu 202 of a document manager application. While the subject technology is described herein in terms of icons being presented on a menu, in some implementations, any other menu element(s) associated with command(s) may be used in place or instead of the icon(s). In other words, an icon is an example of a menu element.

After pressing the menu button 108, the user may drag a touching device (e.g., a finger or a stylus) across the touchscreen 106 to select one of the icons 204.$k$. For example, the user may touch the menu button at touch point 208 via the touching device, and then drag the touching device across the touchscreen 106 causing the touchscreen 106 to register touch events at touch points 210A.1-7. The first (in time) touch event from among the touch events at touch points 210A.1-7 corresponds to touch point 210A.1, which is within a dragging-start region 206 of the touchscreen 106. While seven touch points 210A.1-7 are illustrated, the subject technology may be implemented with any number of touch points on the touchscreen 106.

According to some implementations, if after pressing the menu button 108, the user touches the touchscreen 106 within the dragging-start region 206, the mobile device determines that the user is initiating a dragging gesture (e.g., corresponding to the touch points 210A.1-7 if after pressing the menu button 108, the user touches the touchscreen 106 outside the dragging-start region 206 at a position corresponding to an icon 204.k, where k is a number between 1 and 5, the mobile device signals for execution (or executes) a corresponding command of the icon 204.k on the menu touched by the user. The position of the dragging-start region 206 on the touchscreen 106 may be determined using various approaches. For example, the dragging-start region 206 may occupy a bottom portion of the touchscreen 106 a threshold distance from the bottom side of the touchscreen 106. The threshold distance may be a constant distance (e.g., always one centimeter) or a variable distance determined based on an amount of time elapsed between when the user pressed the menu button 108 and when the user first touched the touchscreen 106 after pressing the menu button 108.

As illustrated in FIG. 2A, the dragging gesture associated with the touch points 210A.1-7 is initiated within the dragging-start region, at touch point 210A.1, and is terminated at touch point 210A.7 on the save icon 204.3. As a result, after the dragging gesture associated with the touch points 210A.1-7 is terminated, a command corresponding to an icon 204.3 (e.g., a save document command) at the termination touch point 210A.7 is executed after the dragging gesture is terminated. While the dragging gesture is illustrated in FIG. 2A as including seven touch points, the dragging gesture may have any number of touch points.

In some implementations, the dragging-start region 206 is a region of the touchscreen 106 proximate to the menu button 108. Thus, if after pressing the menu button 108, the user first touches the touchscreen 106 within the dragging-start region 206, there is a high probability that the user is initiating a dragging gesture to select an icon 204.k (where k is a number between 1 and 5) on the menu 202. Alternatively, if after pressing the menu button 108, the user first touches the touchscreen 106 outside of the dragging-start region 206, there is a high probability that the user is selecting an icon corresponding to the touch point, rather than initiating a dragging gesture.

FIG. 2B illustrates the mobile device interface 100 of FIG. 1, including the camera 102, the speaker 104, the touchscreen 106, the menu button 108, the home button 110, and the back button 112. Similarly to FIG. 2A, the touchscreen 106 displays the menu 202 including the icons 204.1-5, the menu 202 may be displayed in response to the user touching the menu button 108 at the touch point 208. The touchscreen 106 includes the dragging-start region 206. After touching the menu button 108 at the touch point 208, the user makes a dragging gesture across the touchscreen 106 through touch points 210B.1-15. As shown, the dragging gesture is initiated within the dragging-start region, at touch point 210B.1, and is terminated at touch point 210B.15. While the dragging gesture is illustrated as including 15 touch points, the dragging gesture may have any number of touch points.

As illustrated in FIG. 2B, the dragging gesture corresponding to the touch points 210B.1-15 involves the user moving the touching device (e.g., the finger or the stylus) to termination touch point 210B.15, which is closer than a threshold length (e.g., 0.3 centimeters) to an edge of the touchscreen 106. The edge of the touchscreen 106 may include one, two, three, or four of the top side, the bottom side, the left side, or the right side of the touchscreen 106. According to some implementations, as a result of the touching device being moved to the termination touch point 210B.15 closer than the threshold length to the edge of the touchscreen 106 the mobile device may determine that the user intends to cancel the dragging gesture and a command corresponding to an icon at the termination touch point 210B.15 may not be executed by the mobile device. Alternatively, the command corresponding to the icon at the termination touch point 210B.15 may be executed and the termination touch point 210B.15 being closer than the threshold length to the edge of the touchscreen may be ignored.

The edge of the touchscreen 106 may include one or more of the following: (i) the bottom side of the touchscreen 106, (ii), the top side of the touchscreen 106, (iii) the left side of the touchscreen 106, (iv) the right side of the touchscreen 106, (v) the bottom and top sides of the touchscreen 106, (vi) the bottom and left sides of the touchscreen 106, (vii) the bottom and right sides of the touchscreen, (viii) the top and left sides of the touchscreen 106, (ix) the top and right sides of the touchscreen 106, (x) the left and right sides of the touchscreen 106, (xi) the bottom, top, and left sides of the touchscreen 106, (xii) the bottom, top, and right sides of the touchscreen 106, (xiii) the bottom, left, and right sides of the touchscreen 106, (xiv) the top, left, and right sides of the touchscreen 106, or (xv) the bottom, top, left, and right sides of the touchscreen 106.

Also, as illustrated in FIG. 2B, the dragging gesture corresponding to the touch points 210B.1-15 involves the user turning the touching device (e.g., the finger or the stylus) to first move away from the menu button 108 and then move back toward the menu button. The turn may be greater than a threshold angle (e.g., greater than 90 degrees). According to some implementations, as a result of the turn being greater than the threshold angle, the mobile device may determine that the user intends to cancel the dragging gesture and the command corresponding to the icon at the termination touch point 210B.15 may not be executed by the mobile device. Alternatively, the command corresponding to the icon at the termination touch point 210B.15 may be executed. The turn and the turning angle may be ignored or not processed by the mobile device.

While the mobile device is illustrated in FIG. 1 and FIGS. 2A-2B is illustrated as being a mobile phone, the subject technology is not limited to mobile phones. The subject technology may be implemented on any mobile device including, for example, a mobile phone, a tablet computer, a personal digital assistant (PDA), an electronic music player, a laptop computer, a desktop computer, etc.

Figure 3:
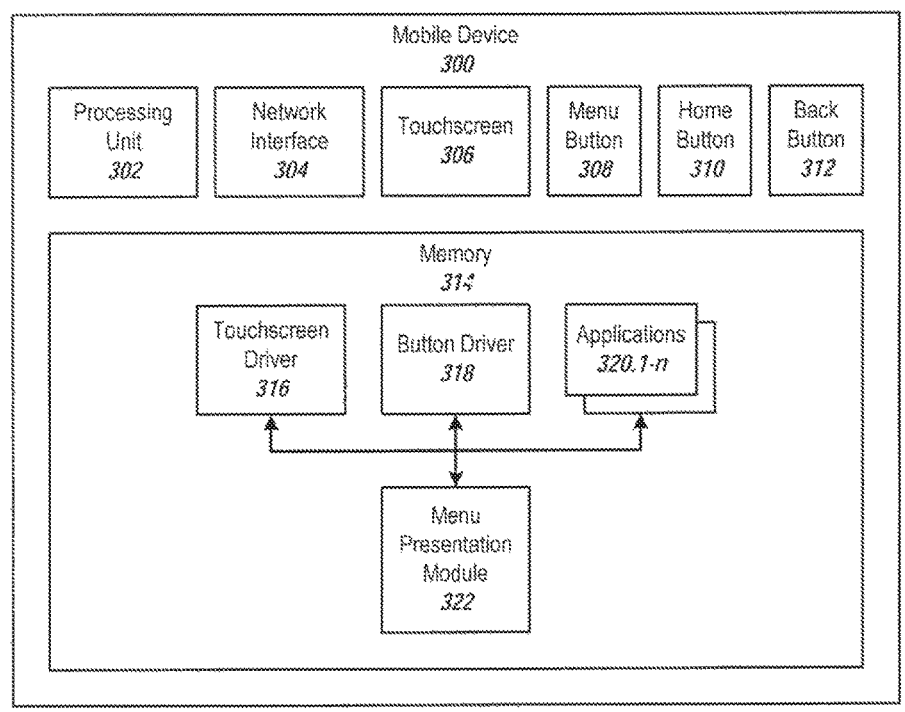
FIG. 3 illustrates an example mobile device configured to present a menu.

FIG. 3 illustrates an example mobile device 300 configured to present a menu. The mobile device 300 may present the mobile device interface 100, as illustrated in FIG. 1 or FIGS. 2A-2B. The mobile device may be a mobile phone, a tablet computer, a personal digital assistant (PDA), an electronic music player, a laptop computer, a desktop computer, etc.

As shown, the mobile device 300 includes a processing unit 302, a network interface 304, a touchscreen 306, a menu button 308, a home button 310, a back button 312, and a memory 314. The processing unit 302 includes one or more processors. The processing unit 302 may include a central processing unit (CPU), a graphics processing unit (GPU), or any other processing unit. The processing unit 302 is configured to execute computer instructions that are stored in a computer-readable medium, for example, the memory 314. The network interface 304 is configured to allow the mobile device 300 to transmit and receive data in a network, e.g., the Internet, a cellular network, a local area network (LAN), a wide area network (WAN), a WiFi network, etc. The network interface 304 may include one or more network interface controllers (NICs). The touchscreen 306 displays information from the mobile device 300 to a user of the mobile device 300 and to receives touch input, via a touching device, from the user. The touchscreen may receive single touch input or multi-touch input. The menu button 308 is a hardware menu button. The menu button 308, when pressed, causes the touchscreen 306 to display a menu. The menu may be a default menu associated with a home screen of the mobile device 300 or a menu associated with an application executing on the mobile device 300 and may include icon(s) that have corresponding command(s). The home button 310, when pressed, causes the mobile device 300 to display a home screen view at the touchscreen 306. The back button 312, when pressed, causes the mobile device 300 to display, at the touchscreen 306, information previously displayed at the touchscreen, for example, a previously displayed webpage in a web browser application. The touchscreen 306, the menu button 308, the home button 310, and the back button 312 may be separate and distinct from one another or may occupy separate and non-overlapping portions of an interface (e.g., interface 100) of the mobile device. The touchscreen 306 may correspond to the touchscreen 106. The menu button 308, home button 310, and back button 312 may correspond to the menu button 108, home button 110, and back button 112, respectively.

The memory 314 stores data and/or instructions. The memory 314 may be one or more of a cache unit, a storage unit, an internal memory unit, or an external memory unit. As illustrated, the memory 314 includes a touchscreen driver 316, a button driver 318, applications 320.1-$n$, and a menu presentation module 322.

The touchscreen driver 316 causes the processing unit 302 to receive touch input (e.g., single touch data or multi-touch data, for instance, touches corresponding to the touch points 210A.1-7 or 210B.1-15) via the touchscreen 306 or provide visual output (e.g., the menu 202 and the icons 204.1-5) via the touchscreen 306.

The button driver 318 causes the processing unit 302 to receive input (e.g., button press data, which may correspond to a touch-down event or a touch-up event) from one or more of the buttons 308, 310, or 312 and to respond to the input from the buttons. In some examples, the button driver 318 operates by issuing an interrupt to other processes being executed by the processing unit 302 to allow the processing unit to respond to the input from the button(s) 308, 310, or 312.

The applications 320.1-$n$ may include any applications executing on the mobile device, for example, a web browser application, document manager application, an online banking application, a social networking application, a game playing application, etc. One or more of the applications 320.1-$n$ may have an associated menu, which is presented if the menu button 308 is pressed while the application is executing and displaying data on the touchscreen 306.

The menu presentation module 322, when executed, causes the processing unit 302 to present a menu at the touchscreen 306, According to some implementations, when executing the menu presentation module 322, the processing unit 302 receives, at a first time, via the button driver 318, an indication of a user pressing the menu button 308. The indication of the user pressing the menu button 308 may be a touch-down event or a touch-up event of the menu button 308. The processing unit 302 presents, in response to the user pressing the hardware menu button, a menu (e.g., menu 202) on the touchscreen 306. The menu includes multiple icons icons 204.1-5) and each icon has a corresponding command. The processing unit 302 receives, at a second time, via the touchscreen driver 316, an indication of the user touching the touchscreen at a starting point (e.g., touch point 210A.1) within a dragging-start region (e.g., dragging-start region 206) of the touchscreen. For example, the processing unit 302 may receive a touch event, signaled by the touch screen 306 and the touchscreen driver 316, at the starting point. The processing unit 302 receives, via the touchscreen driver 316, an indication of the user dragging a touching device along the touchscreen 306 from the starting point to a termination point (e.g., touch point 210A.7), where the termination point is associated with a termination icon (e.g., icon 204.3) of the menu. The indication of the user dragging the touching device may include multiple touch events (e.g., at touch points 210A.1-7) signaled by the touch screen 306 and the touchscreen driver 316, The multiple touch events may correspond to a dragging path of the touching device. The processing unit signals for execution of the corresponding command of the termination icon. The signal for the execution of the corresponding command may be provided to an application, a server, etc.

The position on the touchscreen 306 of the dragging-start region may be determined based on an amount of time elapsed between the first time and the second time. For example, the dragging start region may include a region of the touchscreen 306 within a threshold distance from a bottom side of the touch screen. Alternatively, the dragging start region may include a region of the touchscreen 306 within the threshold distance from a side of the touchscreen 306 (e.g., a top side, a bottom side, a left side, or a right side) corresponding to the position of the menu button 308. In another alternative, the dragging start region may include a region of the touchscreen 306 within the threshold distance from the position of the menu button 308. The position of the menu button 308 may be determined by the processing unit 302 via an application programming interface (API) or may be stored in the memory 314.

In some implementations, the threshold distance is constant (e.g., always 0.8 centimeters). Alternatively, the threshold distance may be determined based on an amount of time elapsed between the first time and the second time. The threshold distance may decrease as an amount of time elapsed increases, due to the fact that the larger the amount of time elapsed, the more slowly and the more precisely the user is likely to be moving the touching device. A linear mathematical relationship may exist between the threshold distance and the amount of time elapsed. According to some examples, the linear mathematical relationship may exist between the threshold distance and the amount of time elapsed may be expressed according to equation (1).

$$d=0, \text{ where } t<0;$$

$$d=1.2-1.6t, \text{ where } 0 \leq t \leq 0.5;$$

$$d=0.4, \text{ where } t>0.5. \quad (1)$$

In equation (1), d represents the threshold distance in centimeters and t represents the amount of time elapsed in seconds. According to equation (1) the threshold distance is initially (at time t=0) set to 1.2 centimeters and is linearly decreased, with respect to the amount of time elapsed, until the threshold distance reaches 0.4 centimeters at an amount of time elapsed of 0.5 seconds. After the amount of time elapsed exceeds 0.5 seconds, the threshold distance is set to 0.4 centimeters, where the threshold distance remains until the menu is closed or a touch event is received on the touchscreen 306 via the touchscreen driver 316. According to other examples, the relationship between the threshold distance and the amount of time elapsed may be different from that expressed in equation (1).

Figure 4A:
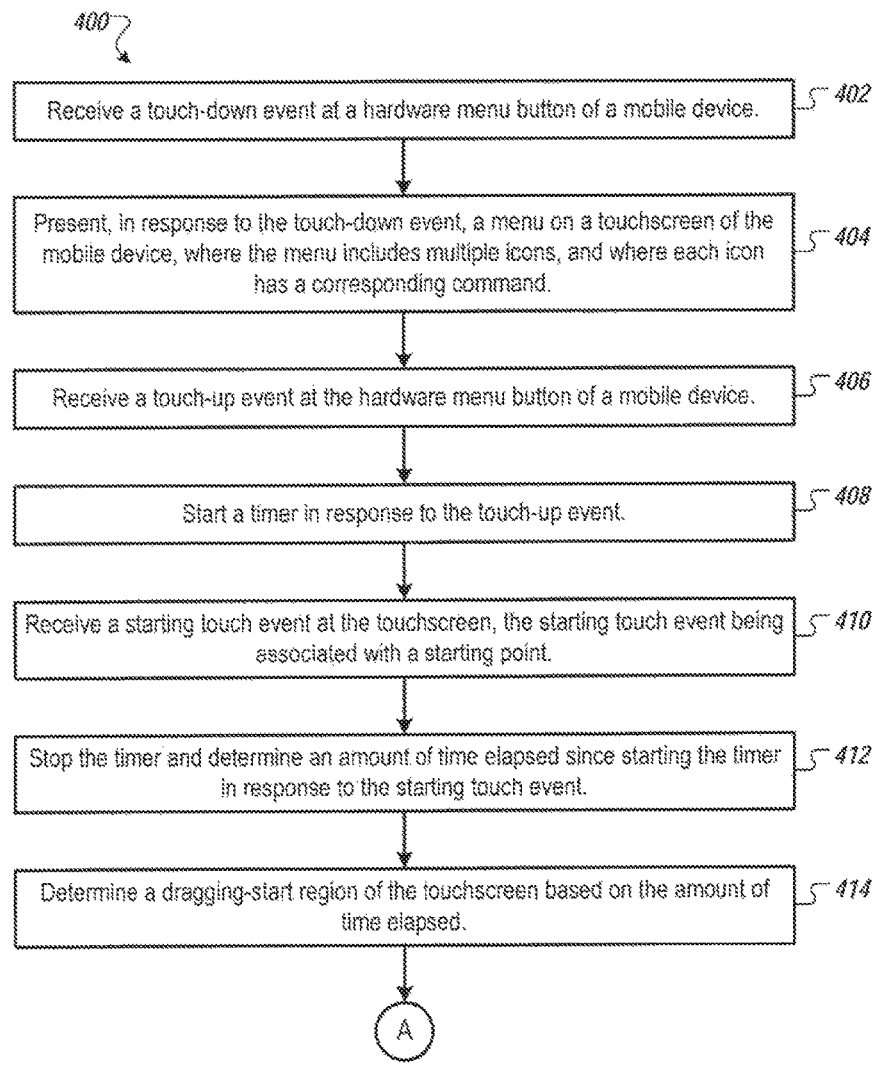
FIGS. 4A-4B illustrates an example process by which a menu may be presented at a mobile device.
Figure 4B:
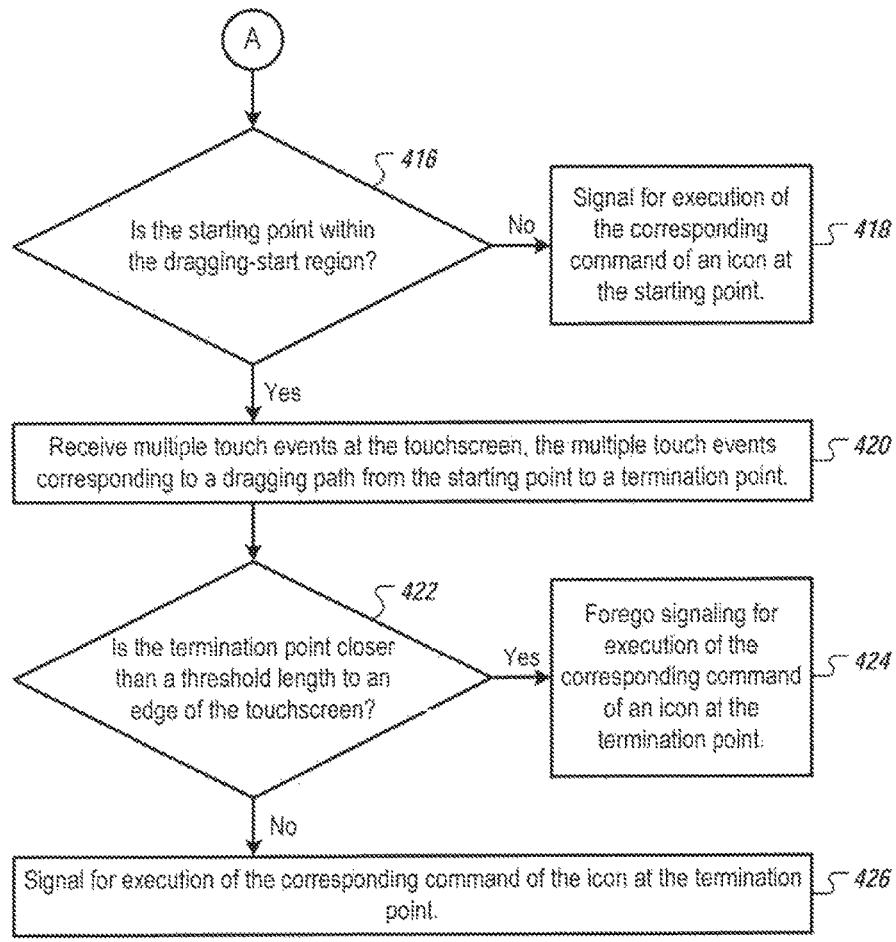

FIGS. 4A-4B illustrate an example process 400 by which a menu may be presented at a mobile device.

As shown in FIG. 4A, the process 400 begins at step 402, where a mobile device (e.g., mobile device 300) receives a touch-down event at a hardware menu button (e.g., menu button 308) of the mobile device. The touch-down event may be received when the user pushes down on the hardware menu button with a touching device.

In step 404, the mobile device presents, in response to the touch-down event, a menu on a touchscreen (e.g., touchscreen 306) of the mobile device. The menu includes multiple icons (e.g., icons 204.1-5). Each icon has a corresponding command.

In step 406, the mobile device receives a touch-up event at the hardware menu button of the mobile device. The touch-up event may be received when the user lifts the touching device off the hardware menu button.

In step 408, the mobile device starts a timer in response to the touch-up event.

In step 410, the mobile device receive a starting touch event at the touchscreen. The starting touch event is associated with a starting point (e.g. touch point 210A.1 or 210B.1). The starting touch event may be received in response to the user touching the touchscreen at the starting point.

In step 412, the mobile device stops the timer and determines an amount of time elapsed since starting the timer in response to the touch event. In some implementations, at technique different from the timer may be used to determine the amount of time elapsed. For example, a time on a clock (e.g., a network clock or a local clock at the mobile device) may be stored in step 408 and in step 412, and the time difference between the two stored times may be determined in step 412.

In step 414, the mobile device determines a dragging-start region of the touchscreen based on the amount of time elapsed. For example, the dragging-start region may correspond to a region of the touchscreen within a threshold distance from a bottom side of the touchscreen, where the threshold distance is determined based on the amount of time elapsed. Techniques for determining the dragging-start region are described in greater detail above in conjunction with FIG. 3. After step 414, the process 400 continues to step 416 of FIG. 4B.

As shown in FIG. 4B, in step 416, the mobile device determines whether the starting point is within the dragging-start region. If the starting point is within the dragging-start region, the process 400 continues to step 420. If the starting point is not within the dragging-start region, the process 400 continues to step 418.

In step 418, if the starting point is not within the dragging-start region, the mobile device signals for execution of the corresponding command of an icon at the starting point. The signal for the execution of the corresponding command may be provided to an application, a server, etc. After step 418, the process 400 ends.

In step 420, if the starting point is within the dragging-start region, the mobile device receives multiple touch events at the touchscreen. The multiple touch events correspond to a dragging path from the starting point to a termination point. The multiple touch events may be received in response to the user moving a touching device along the touchscreen from the starting point to the termination point via the dragging path. A distance between touch events in the multiple touch events may correspond to a moving speed of the touching device or a processing speed of the touchscreen or the touchscreen driver.

In step 422, the mobile device determines whether the termination point is closer than a threshold length (e.g., 0.2 centimeters, 0.3 centimeters, 0.35 centimeters, etc.) to an edge of the touchscreen. If the termination point is closer than the threshold length to the edge of the touchscreen, the process 400 continues to step 424. If the termination point is further or not closer than the threshold length from the edge of the touchscreen, the process 400 continues to step 426.

In step 424, if the termination point is closer than the threshold length to the edge of the touchscreen, the mobile device foregoes signaling for execution of the corresponding command of an icon at the termination point. The mobile device may conclude that the user moved the touching device closer than the threshold distance to the edge of the touchscreen because the user is no longer interested in executing the corresponding command or the user changed his/her mind about executing the corresponding command. After step 424, the process 400 ends.

In step 426, if the termination point is further or not closer than the threshold length from the edge of the touchscreen, the mobile device signals (e.g., to a local application or to a server) for execution of the corresponding command of the icon at the termination point. After step 426, the process 400 ends.

As shown in FIGS. 4A-4B, the steps 402-426 of the process 400 may be executed in a certain order and in series. However, the steps 402-426 of the process 400 may be executed in any order, not necessarily the order specified above. In some examples, two or more of the steps 402-426 may be executed in parallel. In some examples, one or more of the steps 402-426 may be skipped or not executed. For example, some implementations of the process 400 proceed directly from step 420 to step 426, skipping steps 42.2 and 424.

Figure 5:
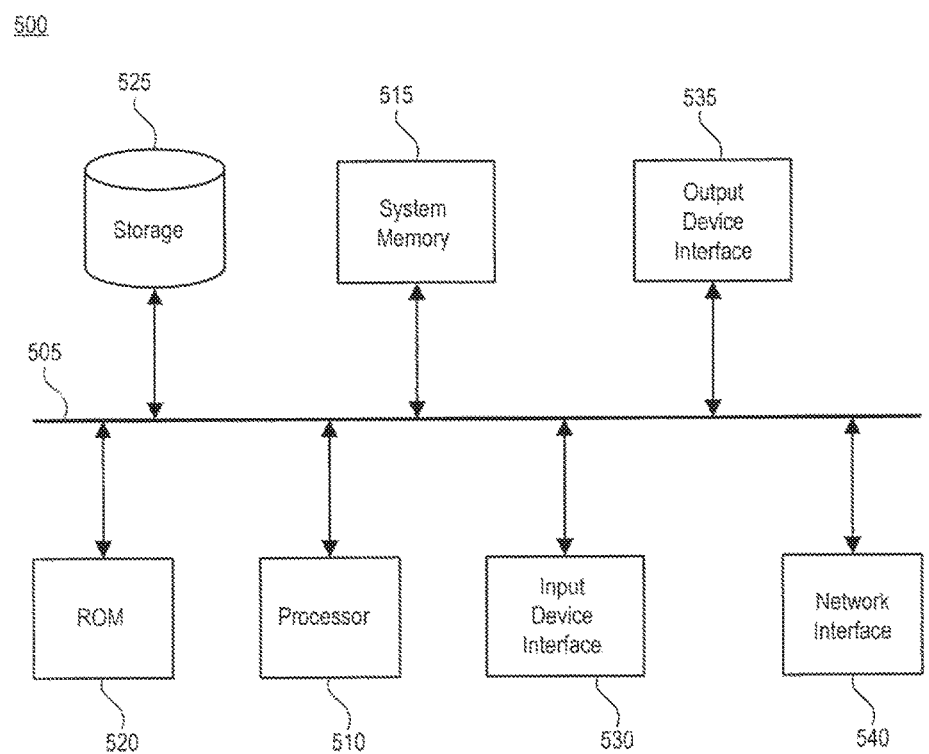
FIG. 5 conceptually illustrates an example electronic system with which some implementations of the subject technology are implemented.

FIG. 5 conceptually illustrates an electronic system 500 with which some implementations of the subject technology are implemented. For example, the mobile device 300 may be implemented using the arrangement of the electronic system 500. The electronic system 500 can be a computer (e.g., a mobile phone, PDA), or any other sort of electronic device. Such an electronic system includes various types of computer readable media and interfaces for various other types of computer readable media. Electronic system 500 includes a bus 505, processing unit(s) 510, a system memory 515, a read-only memory 520, a permanent storage device 525, an input device interface 530, an output device interface 535, and a network interface 540.

The bus 505 collectively represents all system, peripheral, and chipset buses that communicatively connect the numerous internal devices of the electronic system 500. For instance, the bus 505 communicatively connects the processing unit(s) 510 with the read-only memory 520, the system memory 515, and the permanent storage device 525.

From these various memory units, the processing unit(s) 510 retrieves instructions to execute and data to process in order to execute the processes of the subject technology. The processing unit(s) can be a single processor or a multi-core processor in different implementations.

The read-only-memory (ROM) 520 stores static data and instructions that are needed by the processing unit(s) 510 and other modules of the electronic system. The permanent storage device 525, on the other hand, is a read-and-write memory device. This device is a non-volatile memory unit that stores instructions and data even when the electronic system 500 is off Some implementations of the subject technology use a mass-storage device (for example a magnetic or optical disk and its corresponding disk drive) as the permanent storage device 525.

Other implementations use a removable storage device (for example a floppy disk, flash drive, and its corresponding disk drive) as the permanent storage device 525. Like the permanent storage device 525, the system memory 515 is a read-and-write memory device. However, unlike storage device 525, the system memory 515 is a volatile read-and-write memory, such a random access memory. The system memory 515 stores some of the instructions and data that the processor needs at runtime. In some implementations, the processes of the subject technology are stored in the system memory 515, the permanent storage device 525, or the read-only memory 520. For example, the various memory units include instructions for presenting a menu at a mobile device in accordance with some implementations. From these various memory units, the processing unit(s) 510 retrieves instructions to execute and data to process in order to execute the processes of some implementations.

The bus 505 also connects to the input and output device interfaces 530 and 535. The input device interface 530 enables the user to communicate information and select commands to the electronic system. Input devices used with input device interface 530 include, for example, alphanumeric keyboards and pointing devices (also called "cursor control devices"). Output device interfaces 535 enables, for example, the display of images generated by the electronic system 500. Output devices used with output device interface 535 include, for example, printers and display devices, for example cathode ray tubes (CRT) or liquid crystal displays (LCD). Some implementations include devices for example a touch screen that functions as both input and output devices.

Finally, as shown in FIG. 5, bus 505 also couples electronic system 500 to a network (not shown) through a network interface 540. In this manner, the electronic system 500 can be a part of a network of computers (for example a local area network (LAN), a wide area network (WAN), or an Intranet, or a network of networks, for example the Internet. Any or all components of electronic system 500 can be used in conjunction with the subject technology.

The above-described features and applications can be implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage or flash storage, for example, a solid-state drive, which can be read into memory for processing by a processor. Also, in some implementations, multiple software technologies can be implemented as sub-parts of a larger program while remaining distinct software technologies. In some implementations, multiple software technologies can also be implemented as separate programs. Finally, any combination of separate programs that together implement a software technology described here is within the scope of the subject technology. some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment, A computer program may, but need not, correspond to a file in a file system. A program can be stored in a portion of a file that holds other programs or data (one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, for example microprocessors, storage and memory that store computer program instructions in a machine-readable or computer-readable medium (alternatively referred to as computer-readable storage media, machine-readable media, or machine-readable storage media), Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, for example is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, for example application specific integrated circuits (ASICs) or field programmable gate arrays (FPGAs). In some implementations, such integrated circuits execute instructions that are stored on the circuit itself.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

To provide for interaction with a user, implementations of the subject matter described in this specification can be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network (LAN) and a wide area network (WAN), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some aspects of the disclosed subject matter, a server transmits data (e.g., an HTML page) to a client device (e.g., for purposes of displaying data to and receiving user input from a user interacting with the client device). Data generated at the client device (e.g., a result of the user interaction can be received from the client device at the server.

It is understood that any specific order or hierarchy of steps in the processes disclosed is an illustration of example approaches. Based upon design preferences, it is understood that the specific order or hierarchy of steps in the processes may be rearranged, or that all illustrated steps be performed. Some of the steps may be performed simultaneously. For example, in certain circumstances, multitasking and parallel processing may be advantageous. Moreover, the separation of various system components illustrated above should not be understood as requiring such separation, and it should be understood that the described program components and systems can generally be integrated together in a single software product or packaged into multiple software products.

Various modifications to these aspects will be readily apparent, and the generic principles defined herein may be applied to other aspects. Thus, the claims are not intended to be limited to the aspects shown herein, but is to be accorded the full scope consistent with the language claims, where reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject technology.

A phrase, for example, an "aspect" does not imply that the aspect is essential to the subject technology or that the aspect applies to all configurations of the subject technology. A disclosure relating to an aspect may apply to all configurations, or one or more configurations. A phrase, for example, an aspect may refer to one or more aspects and vice versa. A phrase, for example, a "configuration" does not imply that such configuration is essential to the subject technology or that such configuration applies to all configurations of the subject technology. A disclosure relating to a configuration may apply to all configurations, or one or more configurations. A phrase, for example, a configuration may refer to one or more configurations and vice versa.

What is claimed is:

1. A method comprising:
    receiving, at a first time, an indication of a user touching a hardware menu button of a computing device, wherein the hardware menu button is separate and distinct from a touchscreen of the computing device;
    in response to the received indication of the user touching the hardware menu button, presenting a menu on the touchscreen, wherein the menu comprises a plurality of menu elements, and wherein each menu element has a corresponding command;
    receiving, at a second time, an indication of the user touching the touchscreen at a starting point;
    based on an amount of time elapsed between the first time and the second time, determining a threshold distance;
    determining a position of the hardware menu button relative to the touchscreen;
    setting a dragging-start region, wherein the dragging-start region comprises a region of the touchscreen within the threshold distance from the position of the hardware menu button;
    determining the starting point is within the dragging-start region;
    receiving an indication of the user dragging a touching device along the touchscreen from the starting point within the dragging-start region to a termination point, wherein the termination point is associated with a termination menu element within the plurality of menu elements; and
    signaling, in response to the received indication of the user dragging the touching device along the touchscreen, for execution of the corresponding command of the termination menu element.

2. The method of claim 1, wherein the threshold distance is from a side of the touchscreen corresponding to the position of the hardware menu button.

3. The method of claim 1, wherein the indication of a user touching a hardware menu button comprises a touch-up event of the hardware menu button.

4. The method of claim 1, wherein the indication of a user touching a hardware menu button comprises a touch-down event of the hardware menu button.

5. The method of claim 1, wherein the indication of the user touching the touchscreen at the starting point comprises a touch event at the starting point, and wherein the indication of the user dragging the touching device along the touchscreen from the starting point to the termination point comprises a plurality of touch events along a dragging path between the starting point and the termination point.

6. The method of claim 1, wherein the menu comprises a default menu for a home screen of the computing device.

7. The method of claim 1, wherein the menu comprises a menu within an application of the computing device.

8. The method of claim 1, wherein each menu element comprises an icon.

9. A non-transitory computer-readable medium comprising instructions which, when executed by a computer, cause the computer to implement a method, the method comprising:
- receiving an indication of a user touching a hardware menu button of the computer at a first time, wherein the hardware menu button is separate and distinct from a touchscreen of the computer;
- in response to the received indication of the user touching the hardware menu button, presenting a menu on the touchscreen, wherein the menu comprises a plurality of menu elements, and wherein each menu element has a corresponding command;
- receiving, at a second time, an indication of the user touching the touchscreen at a starting point;
- based on an amount of time elapsed between the first time and the second time, determining a threshold distance;
- determining a position of the hardware button relative to the touchscreen;
- setting a dragging-start region, wherein the dragging start region comprises a region of the touchscreen within the threshold distance from the position of the hardware button;
- determining the starting point is within the dragging-start region;
- receiving an indication of the user dragging a touching device along the touchscreen along a dragging path from the starting point within the dragging-start region to a termination point, wherein the termination point is associated with a termination menu element;
- determining, in response to the received indication of the user dragging the touching device along the touchscreen, whether the termination point is within the dragging-start region;
- signaling for execution of the corresponding command of the termination menu element in a case where the termination point is not within the dragging-start region; and
- foregoing signaling for execution of the corresponding command of the termination menu element in a case where the termination point is within the dragging-start region.

10. The non-transitory computer-readable medium of claim 9,
wherein the threshold distance is from a side of the touchscreen corresponding to the position of the hardware menu button.

11. The non-transitory computer-readable medium of claim 9, wherein the indication of a user touching a hardware menu button comprises a touch-up event or a touch-down event of the hardware menu button.

12. A computing device comprising:
- a touchscreen;
- a hardware menu button separate and distinct from the touchscreen;
- one or more processors; and
- a memory comprising instructions which, when executed by the one or more processors, cause the one or more processors to implement a method, the method comprising:
  - receiving, at a first time, a touch event from a user at the hardware menu button;
  - in response to the received touch event at the hardware menu button, presenting a menu on the touchscreen, wherein the menu comprises a plurality of menu elements, and wherein each menu element has a corresponding command;
  - receiving, at a second time, a plurality of touch events at the touchscreen, the plurality of touch events corresponding to a dragging path from a starting point to a termination point;
  - setting a dragging start region of the touchscreen based on an amount of time elapsed between the first time and the second time;
  - determining the starting point is within the dragging-start region;
  - determining the user is initiating a dragging gesture comprising the dragging path from the starting point within the dragging-start region to the termination point;
  - determining whether the dragging path comprises a turn greater than a threshold angle;
  - signaling, in response to the determined dragging gesture not comprising a turn greater than the threshold angle, for execution of the corresponding command of a termination menu element associated with the termination point; and
  - cancelling the dragging gesture in response to the determined dragging gesture comprising a turn greater than the threshold angle.

13. The method of claim 1, wherein the threshold distance is shorter as the amount of time elapsed increases.

14. The non-transitory computer-readable medium of claim 9, wherein the threshold distance is shorter as the amount of time elapsed increases.

* * * * *